May 3, 1966  G. W. STANTON ETAL  3,249,655
COMPOSITIONS COMPRISING GRAFT COPOLYMERS OF CERTAIN MONOMERIC
POLYGLYCOL ETHERS OF ALKENYL AROMATICS ON
ACRYLONITRILE POLYMER SUBSTRATES
Filed April 4, 1962

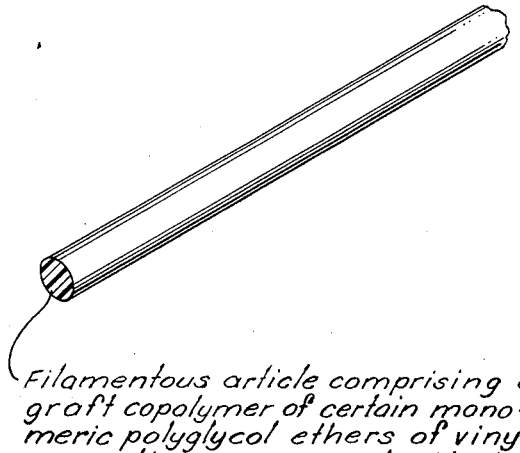

Filamentous article comprising a graft copolymer of certain monomeric polyglycol ethers of vinyl aromatics on an acrylonitrile polymer substrate.

INVENTORS.
George W. Stanton
BY Teddy G. Traylor

Griswold & Burdick
ATTORNEYS

United States Patent Office 3,249,655
Patented May 3, 1966

3,249,655
COMPOSITIONS COMPRISING GRAFT COPOLYMERS OF CERTAIN MONOMERIC POLYGLYCOL ETHERS OF ALKENYL AROMATICS ON ACRYLONITRILE POLYMER SUBSTRATES
George W. Stanton, Walnut Creek, and Teddy G. Traylor, Del Mar, Calif., assignors to The Dow Chemical Company, Midland, Mich., a corporation of Delaware
Filed Apr. 4, 1962, Ser. No. 188,917
10 Claims. (Cl. 260—881)

This application is a continuation-in-part of copending application for United States Letters Patent having Serial No. 711,936, filed January 29, 1958, now abandoned.

The present invention lies generally in the field of organic chemistry and contributes in particular to the art which pertains to synthetic, fiber-forming high polymers. More particularly, the present invention has reference to the provision of certain readily-dyeable graft or block-type copolymers that are comprised of certain monomeric polyglycol ethers of vinyl aromatics polymerized on acrylonitrile polymer substrates.

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Polymers and copolymers of acrylonitrile which contain in the polymer molecule at least about 80 percent by weight of combined acrylonitrile units may be utilized with great advantage for such purposes. Difficulty is often encountered, however, in suitably dyeing synthetic hydrophobic fibers and the like that have been prepared from acrylonitrile polymers, especially those that are comprised essentially of polyacrylonitrile. This is especially so when it is attempted to obtain relatively deeper shades of coloration in the finally dyed product.

Various techniques have been evolved for providing acrylonitrile polymer compositions of improved dyeability. These include copolymerizing acrylonitrile with various monomeric materials which are intended to lend an enhanced dye-receptivity to the copolymeric product; blending polyacrylonitrile or other acrylonitrile polymers with one or more dye-receptive polymeric materials prior to formation of a fiber product or to the shaped article; and impregnating an already-formed acrylonitrile polymer fiber or other shaped article with a dye-assisting adjuvant or dye-receptive agent, which frequently may be a polymeric material.

The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified acrylonitrile polymers, particularly polyacrylonitrile. Also, such products, once they have been prepared, may not be as receptive as might be desired to a wide range of dyestuffs, due to inherent limitations in the materials capable of being employed for enhancing dye-receptivity. In addition, especially when textile fiber products are involved, treatment or modification of the acrylonitrile polymer article in any of the indicated known ways may not always permit uniform penetration of the dye throughout the cross-section of the fiber. Frequently, the articles which have been modified according to known procedures may exhibit an undesirable tendency to accept a dyestuff only in their peripheral portions. When this phenomenon occurs (which, in connection with fiber products, is ordinarily referred to as ring-dyeing), fibrillation of the fiber, such as normally results from its use, exposes the uncolored interior portions. Such behavior, of course, is undesirable and objectionable in fabrics and other textile materials constructed with fibers of the acrylonitrile polymers.

It would be advantageous, and it is the chief aim and concern of the present invention, to provide acrylonitrile polymers which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified acrylonitrile polymer substrates, and of the general order obtainable with unmodified polyacrylonitrile. This would possibilitate the manufacture of acrylonitrile polymer based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which consists of an acrylonitrile polymer substrate having a minor proportion of substituents graft copolymerized thereto which comprise or consist essentially of the polymerized monomeric polyglycol ethers of alkenyl aromatics. Schematically, the compositions may be structurally represented in the following manner:

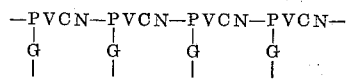

wherein the interlinked "PVCN" symbols represent the acrylonitrile polymer substrate or trunk and the symbols "G" connected thereto the substituent graft copolymer branches of the indicated monomeric polyglycol ethers of alkenyl aromatics provided thereon.

As is apparent, the graft copolymer substituent that is combined with the acrylonitrile polymer substrate lends the desired receptivity of and substantivity for various dyestuffs to the compositions while the acrylonitrile polymer trunk substrate that is so modified facilitates and secures the excellent physical properties and characteristics of the various shaped articles, including fibers into which the compositions may be fabricated. Advantageously, as mentioned, the acrylonitrile polymer substrate that is modified by graft copolymerization to provide the compositions of the invention contains in the polymer molecule at least about 80 percent by weight of combined acrylonitrile. More advantageously, the acrylonitrile polymer substrate consists substantially or essentially of polyacrylonitrile.

It is usually beneficial, as has been indicated, for the graft copolymer compositions of the present invention to contain a major proportion of the acrylonitrile polymer trunk or substrate that has been modified with the substituent dye-receptive graft copolymer groups chemically attached thereto. As a general rule, for example, it is desirable for the graft copolymer to be comprised of at least about 80 percent by weight of the acrylonitrile polymer substrate. In many instances, it may be satisfactory for the graft copolymer composition to be comprised of between about 85 and 95 percent by weight of the acrylonitrile polymer substrate, particularly when it is polyacrylonitrile. In this connection, however, better dyeability may generally be achieved when the grafted monomer derived substituents are prepared under such conditions that they have relatively long chain lengths. Thus, it is usually preferable, when identical quantities of grafted substituent are involved for relatively fewer, but longer chain length grafts to be available than to have a greater number of substituents of relatively shorter chain length.

The monomeric polyglycol ethers of alkenyl aromatics which are utilized as monomers to modify the acrylonitrile polymer substrates so as to provide the graft copolymer compositions of the present invention may be any of those (or their mixtures) of the structural formula:

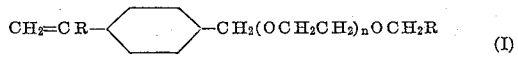

(I)

wherein R is selected from the group consisting of hydrogen and methyl radicals and $n$ has an average numerical value between about 1 and 40, advantageously between about 10 and 20.

The monomeric alkenyl benzyl polyglycol ether that is employed may have a molecular weight between about 200 and about 2,000, advantageously from about 236 to 1200. Typically advantageous species of monomers according to the present invention are 1-(2-ethoxyethoxy)-2-vinyl-benzyloxyethane (e.g., according to Formula I, where R is hydrogen, $m$ is 2 and $n$ is 0); vinyl monomers wherein $m$ is about 15 and $n$ is 0 in Formula I; and vinyl monomers wherein $m$ is about 20 and $n$ is 2 in Formula I, particularly in the latter two cases when G is methoxy or ethoxy as further exemplified by such species as a polyglycol-2-vinylbenzyloxyethane derived as indicated from a polyoxyethylene glycol having an average molecular weight of about 200–600, advantageously from about 500 to 600. This monomer, may also be called a polyethyleneglycol; ethyl ether, p-vinylbenzyl ether derived from the indicated type of polyoxyethylene glycol or a p-ethoxy poly(ethyleneoxy) methyl styrene derived from such a polyoxyethylene glycol.

The present monomeric alkenyl benzyl polyglycol ethers are readily prepared by the reaction between vinyl benzyl chloride (or isopropenyl benzyl chloride) and a suitable polyglycol or polyglycol derivative to provide a polyglycol moiety in the monomer of the above-indicated scope. The reaction that is involved is analogous and proceeds in a way generally similar to that between benzyl chloride and simple alcohols, as discussed at page 1167 of "Organic Chemical Compounds" by E. H. Huntress (Wiley & Sons, 1948). When an unmodified polyglycol is employed in preparation of a monomeric product according to the present invention, it is ordinarily advantageous to conduct the reaction with a large excess of the polyglycol. This tends to avoid reaction on both ends of the polyol so as to preclude formation of polyfunctional divinyl (or diisopropenyl) monomer products that tend to crosslink on polymerization. Such expedient is usually unnecessary when the monomers are prepared from polyglycol derivatives.

As mentioned, the graft copolymer compositions of the invention have remarkably good dye-receptivity, particularly in view of their acrylonitrile polymer origin. In most cases, for example, the dye-receptivity of the graft copolymer compositions of the present invention is improved to such an extent in comparison with unmodified acrylonitrile polymers, particularly unmodified polyacrylonitrile, that a color differential of at least about 30 Judd units, as hereinafter illustrated, may readily be obtained between samples of the unmodified acrylonitrile polymer substrate and the graft copolymer compositions of the present invention, each of which has been dyed at a 4 percent dyeing, according to conventional techniques with such a dyestuff as Amacel Scarlet BS (American Prototype Number 244 or Colour Index Disperse Red 1 or 11110). This is a significant advantage when the compositions are fabricated into shaped article form, especially when they are prepared in a filamentary form suitable for use as a textile material.

The Judd unit is described by D. B. Judd in the "American Journal of Psychology," vol. 53, page 418 (1939). More applicable data appears in "Summary on Available Information on Small Color Difference Formulas," by Dorothy Nickerson in the "American Dyestuff Reporter," fol. 33, page 252, June 5, 1944. Also see "Interrelation of Color Specifications," by Nickerson in "The Paper Trade Journal," vol. 125, page 153, for November 6, 1947.

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using vat, acetate, direct, naphthol, and sulfur dyes. Such dyestuffs, in addition to the particular variety mentioned, by way of didactic illustration, as Calcocid Alizarine Violet (Colour Index 61710, formerly Colour Index 1080), Sulfanthrene Red 3B (Colour Index Vat Violet 2), naphthol ASMX (Colour Index 35527), Fast Red TRN Salt (Colour Index Azoic Diazo 11), and Immedial Bordeaux G (Colour Index unknown or unestablished) may advantageously be employed for such purposes.

Other dyestuffs, by way of further illustration, that may be utilized beneficially on fiber products of the dye-receptive graft copolymer compositions of the invention include such direct cotton dyes as Chlorantine Fast Brown CLL (Colour Index unknown or unestablished), Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such mordant-acid dyes as Alizarine Light Green GS (Colour Index Acid Green 25) and Brilliant Alizarine Sky Blue BS PAT (Colour Index unknown or unestablished); such basic dyes as Brilliant Green Crystals (Colour Index Basic Green 1, Du Pont Methylene Blue ZK (Colour Index unknown or unestablished) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Black PG Dbl. (Colour Index unknown or unestablished), Sulfanthrene Blue 2B Dbl. paste (Colour Index Vat Blue 5), and Sulfanthrene Red 3B paste (Colour Index Vat Violet 2); Indigosol Green IB Powder (Colour Index unknown or unestablished), a soluble vat dyestuff; such acetate dyes as Celliton Fast Brown 3RA Extra CF (Colour Index Dispersed Orange 5), Celliton Fast Rubine BA CF (Colour Index Dispersed Red 13), Artisil Direct Black BKZ (Disperse Dye-Mixture-Colour Index unknown or unestablished), Artisil Direct Navy BR (Disperse Dye-Mixture-Colour Index unknown or unestablished), Artisil Direct Red 3BP and Celanthrene Red 3BN Conc. (both Colour Index Dispersed Red 15), Celanthrene Pure Blue BRS 400 percent (Colour Index Dispersed Blue 1), Acetamine Orange 3R conc. (Colour Index unknown or unestablished) and Acetamine Yellow N (Colour Index Dispersed Yellow 32); B-naphthol 2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and premetallized dyestuffs including Cibalan Yellow GRL and Supralan Blue NB (both of unknown or unestablished Colour Index); and the like.

The dye products, especially textile fiber products, are generally lightfast and are well imbued with good resistance to crocking. A shaped filamentary article prepared from a dye-receptive composition in accordance with the present invention is schematically illustrated in the sole figure of the hereto annexed drawing.

The dye-receptive graft copolymers of the present invention may be prepared and provided by impregnating the acrylonitrile polymer substrate with the monomeric substance then polymerizing the monomer in situ in the acrylonitrile polymer substrate. Advantageously, this may be accomplished when the substrate is in the form of an already shaped article, such as a fiber of filamentary structure. Beneficially, the graft copolymerization of the impregnated monomer may be accomplished and facilitated with the assistance of a polymerization catalyst or catalyzing influence which preferentially interacts with the substrate so as to establish or form a grafting site in order to simultaneously or subsequently initiate the graft copolymerization. As a practical manner, it is generally most desirable to form the graft copolymer compositions in such manner. Most of the free radical generating chemical catalyst, including peroxide and persulfate catalysts, may be utilized for the desired graft copolymerization. It may often be exceptionally advantageous, however, to accomplish the graft copolymerization by subjecting the monomer-impregnated acrylonitrile polymer substrate to a field of high energy radiation in order to efficiently provide an effectively attached graft copolymer of the polymerized monomeric impregnant on the hydrophobic acrylonitrile polymer substrate. Thus, the graft copolymer compositions of the present invention may advantageously be provided in accordance with the general procedure that is described in now-abandoned application for United States Letters Patent of George W. Stanton and Teddy G. Traylor having Serial No. 553,701, filed December 19, 1955, disclosing a "Process for Treating Shaped Polymeric Articles To Improve Dyeability."

The monomer may be intimately impregnated in the acrylonitrile polymer substrate in any desired manner prior to the graft copolymerization. Thus, the monomer may be directly applied or it may be applied from dispersion or solution in suitable liquid vehicles until a desired monomer content has been obtained. Ordinarily, it is advantageous for the monomer to be diluted in a solvent or dispersant vehicle so as to provide a treating bath in which to impregnate the acrylonitrile polymer substrate with the latter being immersed in the bath for a sufficient period of time to attain a desired monomer content in the polymer substrate which, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the acrylonitrile polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus fibers and films may be treated before or after any stretch has been imparted thereto. In addition, they may be in various stages of orientation, or in a gel, swollen or dried condition. It is generally advantageous to prepare the compositions of the invention by impregnating the monomer into the acrylonitrile polymer substrate while the latter is in a water-swollen or hydrated aquagel condition, prior to being finally converted to a dried polymer structure. Such aquagels may be obtained by forming the shaped acrylonitrile polymer articles from the acrylonitrile polymer while it is dissolved in an aqueous saline solution thereof (such as a 60 percent by weight aqueous zinc chloride solution) as by coagulation in a suitable aqueous liquid bath capable of having such effect. When impregnating baths of the monomer are employed, it is generally desirable for them to have a monomer concentration of between about 0.5 and 50 percent by weight and to be prepared as an aqueous solution of the monomer. This is particularly the case when acrylonitrile polymers in an aquagel condition are being impregnated. The impregnation of acrylonitrile polymer fibers and related shaped articles from such a bath may be continued until between about 0.5 and 20 percent by weight of monomer, more or less, based on the weight of the acrylonitrile polymer substrate is incorporated in the substrate. Obviously, unfabricated polymers may be impregnated in an analogous manner. Ordinarily, an impregnating bath having a monomer concentration of between about 5 and 15 percent by weight may advantageously be employed to impregnate the acrylonitrile polymer substrate with monomer in an amount between about 5 and 15 percent by weight of the polymer substrate.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose.

When the graft copolymer compositions are prepared from preformed or already shaped acrylonitrile polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the acrylonitrile polymer substrate being modified in order to provide the compositions of the present invention.

For purposes of specifically illustrating, without intending to thereby limit the invention, the following didactic examples are provided wherein, unless otherwise indicated, all parts and percentages are to be taken by weight.

*Example I*

An oriented polyacrylonitrile aquagel fiber that contained about 1 part of polymer hydrated with about 2 parts of water was soaked for about 15 minutes at 70° C. in a 9.40 percent aqueous solution of a monomer that was a polyglycol-2-vinyl-benzyloxyethane derived from a polyoxyethylene glycol having an average molecular weight of about 600. The wet fiber, after being drained of excess impregnating solution, was sealed in a polyethylene bag and then irradiated by exposing it at room temperature to a high energy, X-ray radiation beam from a Van de Graaff Electrostatic Generator operating under a potential of 2 million electron volts with a 250 microampere beam current impinging on a tungsten target. The monomer impregnated fiber was subjected to the high energy at a dose rate of about 20 mreps. (million roentgen equivalent physicals) per minute until a total dose of about 8 mreps. had been obtained. The irradiated yarn was then washed thoroughly with water, dried, heat treated for 5 minutes at 150° C., scoured and then dyed for one hour at the boil in a conventional manner with Amacel Scarlet BS an acetate type of dyestuff (American Prototype No. 244). A deep and level shade of coloration was obtained. In contrast, the unmodified yarn could be dyed to only the faintest degree with the same dyestuff. The irradiated yarn was then washed thoroughly with water, dried, heat treated for 5 minutes at 150° C., scoured and then dyed for one hour at the boil in Sevron Brilliant Red 4G, a basic dye formerly known as Basic Red 4G. A deep red shade of coloration was obtained. In contrast, the unmodified yarn could be dyed to only the faintest degree with the same dyestuff.

*Example II*

The procedure of Example I was repeated excepting to employ a 10 percent solution of a mono-vinylbenzyloxyethane ether of a polyoxyethylene glycol having an average molecular weight of about 500 as the impregnating bath. The impregnated aquagel was irradiated at a rate of 6 mrad per second until a total dosage of 10 mrad was effected. After being washed and heat set, separate samples of the graft copolymer fiber product were dyed with both Amacel Scarlet BS and Sevron Brilliant Red 4G, formerly known as Basic Red 4G (Colour Index Basic Red 14). The improvement in dye-receptivity between the graft copolymerized fiber product of the present invention in comparison with unmodified acrylonitrile polymers was such that color differentials of about 20–40 Judd units were obtained between the dyed graft copolymer composition and the unmodified acrylonitrile polymer fiber. Improved dyeability with Calcodur Pink 2BL (Colour Index 353), a direct dyestuff, was also achieved in the graft copolymerized product.

Results similar to the foregoing may also be obtained when other of the mentioned varieties of the monomeric polyglycol esters of vinyl aromatics of Formula I are utilized in place of those set forth in the above examples and when graft copolymers are prepared with shaped articles or unfabricated forms of acrylonitrile polymers (including various copolymers) that are treated and irradiated in other than aquagel forms.

What is claimed is:

1. Dye-receptive graft copolymer composition comprised of (1) an acrylonitrile polymer substrate which is a polymer of polymerizable, acrylonitrile-containing, ethylenically unsaturated monomeric material that has in the polymer molecule at least about 80 weight percent of polymerized acrylonitrile, said acrylonitrile polymer having chemically attached to carbon atoms in its chain, as graft copolymerized substituents thereon, a minor proportions of units of a polymerized monomeric polyglycol ether of an alkenyl aromatic of the formula:

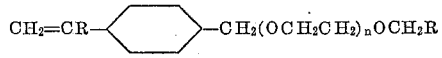

wherein R is selected from the group consisting of hydrogen and methyl radicals and $n$ has an average numerical value between about 1 and 40.

2. The composition of claim 1, wherein said acrylonitrile polymer has up to about 20 percent by weight, based on the weight of the composition, of said substituent graft copolymerized units attached thereto.

3. The composition of claim 1, wherein said acrylonitrile polymer has between about 5 and 15 percent by weight, based on the weight of the composition, of said substituent graft copolymerized units attached thereto.

4. The composition of claim 1, wherein said acrylonitrile polymer is polyacrylonitrile.

5. The composition of claim 1, wherein said substituent graft copolymer units are comprised of polymerized 1-(2-ethoxyethoxy)-2-vinyl-benzyloxyethane.

6. The composition of claim 1, wherein said substituent graft copolymer units are comprised of a polymerized polyglycol-2-vinyl-benzyloxyethane derived from a polyoxyethylene glycol having an average molecular weight of about 600.

7. The composition of claim 1, wherein said acrylonitrile polymer is polyacrylonitrile and wherein said substituent graft copolymerized units are present in an amount up to about 20 percent by weight, based on the weight of the composition, and are comprised of polymerized polyglycol-2-vinyl-benzyloxyethane derived from a polyoxyethylene glycol having an average molecular weight of about 600.

8. A filamentary shaped article comprised of the composition set forth in claim 7.

9. A filamentary shaped article comprised of the composition set forth in claim 1.

10. Method for the preparation of a dye-receptive graft copolymer which comprises polymerizing a minor proportion of a monomer of the formula:

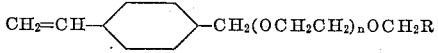

wherein R is selected from the group consisting of hydrogen and methyl radicals and $n$ has an average numerical value between about 1 and 40, in the presence of a preformed acrylonitrile polymer which is a polymer of polymerizable, acrylonitrile-containing, ethylenically unsaturated monomeric material that has in the polymer molecule at least about 80 weight percent of polymerized acrylonitrile.

References Cited by the Examiner

UNITED STATES PATENTS 2,794,793   6/1957   Coover _____ 260—883

FOREIGN PATENTS 764,299   12/1956   Great Britain.

MURRAY TILLMAN, *Primary Examiner.*

LEON J. BERCOVITZ, *Examiner.*